Patented Sept. 10, 1946

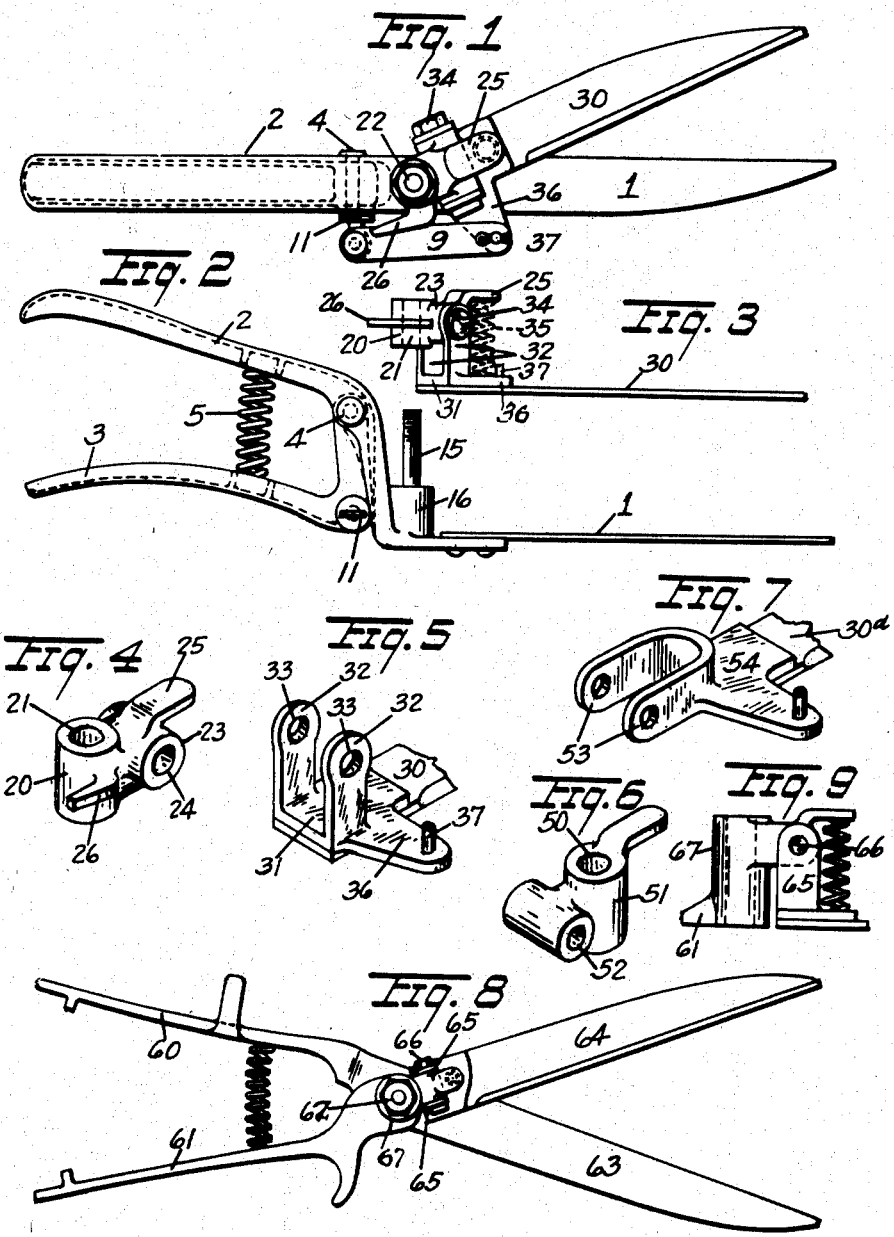

2,407,237

UNITED STATES PATENT OFFICE 2,407,237

SHEARS

David Howard Keiser, Jr., West Lawn, Pa.

Application January 25, 1945, Serial No. 574,507

7 Claims. (Cl. 30—248)

My invention relates generally to shears, and more specifically to improvements particularly applicable to the type of shears shown in my prior Patent No. 2,281,977, of May 5, 1942, my present primary object being to provide a new construction of the shear blades and their pivotal mounting which will embody the advantageous cutting action of my aforesaid patent with a more positive and longer wearing pivotal bearing and a simplified and better cooperating spring-tensioned engagement of the cutting edges of the shear blades.

The nature of my improvements and the manner of their operation will be more fully described hereinafter, in connection with the accompanying drawing, and the novel features thereof defined in the appended claims.

In the drawing:

Fig. 1 is a top view of a shears of the type shown in my aforesaid patent, and indicating a preferred embodiment of my present improvements.

Fig. 2 is a side elevation of the shears shown in Fig. 1, with one blade removed and showing the pivot post for the removed blade.

Fig. 3 is a side elevation of the removed blade and its mounting ready to be engaged on the pivot post shown in Fig. 2.

Fig. 4 is a separate perspective elevation of the pivot sleeve engageable on the pivot post of Fig. 2.

Fig. 5 is a separate perspective elevation of the blade carrier adapted to be pivotally engaged with the transverse bearing shown in Fig. 4.

Figs. 6 and 7 are views corresponding respectively with Figs. 4 and 5, and indicating a substitute modified construction.

Fig. 8 indicates a type of shears differing from that shown in Fig. 1, and indicating how my invention may be applied thereto.

Fig. 9 is a fragmentary side elevation of the pivotally connected portion thereof.

The shears shown in Figs. 1 and 2 are similar to the one shown in my aforesaid Patent No. 2,281,977, as reference to the same will disclose, and comprise a blade 1 fixed to a handle 2, with a cooperating handle 3, pivoted at 4 to handle 2, and tensioned by spring 5, and handle 2 is formed with a boss 16 having a vertical post 15 forming the pivotal connection for a cooperating blade, all as shown in my prior patent.

In my present improvements I employ a novel construction of the cooperating blade and different means from that of my aforesaid patent for mounting the same, and, as shown, these comprise a sleeve member 20 having a bearing aperture 21 adapted to engage pivot post 15 and held thereon by a nut 22, with suitable interposed washers if desired, so as to freely turn axially thereon. Sleeve 20 is shown with a lateral extension 23 having a bearing aperture 24 transverse to the bore 20, a projecting spring-seating arm 25, and a stop arm 26 for limiting pivotal turning movement of sleeve 20 in one direction.

The cooperating blade 30, as shown, is secured to a blade-carrier 31 having upstanding ears 32, 32, with apertures 33, 33, and is adapted to be pivotally engaged with aperture 24 of sleeve 20 by a pivot bolt 34 having a suitable nut and interposed washers as shown, so as to pivotally support carrier 31 in free vertical independent movement on said axially turnable sleeve 20. When sleeve 20 is mounted on post 15, a spring 35, engaging between sleeve arm 25 and blade-carrier 31, tensions blade 30 so as to yieldingly seat it against blade 1 at all times during the opening and closing of said blades 1 and 30. Carrier 31 is shown as having a lateral extension 36 with a pivot stud 37, for engagement of a link arm 9 pivotally connecting it to an ear 11 on handle 3, so that said handle 3 may axially swing said carrier 31 on pivot post 15 to open and close the shear blades, as in my prior patent aforesaid. Stop 26 engages against handle 2 when the blades are closed together.

Handle 3, operating through link 9, pivotally connected to lateral extension 36, located at a distance below pivot 34, will not only act to turn sleeve 20 on its pivot post 15, but will exert a downward swinging movement of transversely pivoted blade carrier 31 so as to press its blade 30 against blade 1. Spring 35 normally maintains blade 30 in resilient contact with blade 1, and closing pull of handle 3, as above described, acts to increase pressure in the same direction in needed and required amount to maintain the edges of blades 30 and 1 in positive cutting engagement up to the full cutting capacity of the shears as determined by the force that may be exerted by handle 3.

This improved construction, as above described, provides my desired result of maintaining positive cutting engagement of the blades with pressure determined by the closing force exerted on handle 3, and secures this result without the loose pivotal engagement and canting of the movable blade as necessary in my prior patent. Sleeve 20 has a positive bearing on post 15, maintained against play by properly setting nut 22, and its function is solely to turn on said pivot, as controlled by handle 3, insuring long wear. Blade carrier 31 may freely swing on its pivotal connection to sleeve 20, in a direction transverse, or at right angles, to the pivotal swing of said sleeve and independently of the latter. Spring 35, seated between rigid arm 25 of sleeve 20, and blade carrier 31, exerts a resilient pressure on the latter, and its blade 30, to maintain said blade in contact with blade 1. This pressure contact of the blades is supplemented, as aforesaid, by the closing force exerted by handle 3.

It will thus be seen that my present improvements recognize the advantageous principles involved in my aforesaid patent, but provide new and effective means for utilizing the same in an improved construction insuring more positive controlled cutting action, longer wearing qualities, and with readily produced standard unitary parts simply and economically assembled.

In Figs. 6 and 7 I have indicated a somewhat modified construction of the sleeve and blade carrier, equally embodying the inherent principle of the shears shown in Figs. 1 to 5. In this modification sleeve 51 shows a bearing aperture 50 for post 15, as located at its front end, relative to the shear blades, and having a rearward extension for transverse bearing aperture 52. And blade carrier 54 is shown with pivot ears 53, 53, extending laterally rearward, instead of upwardly, to be connected by a suitable pivot pin engaging in aperture 52 of sleeve 51.

While my improvements are best adapted for, and have been above described as applied to the type of shears of my aforesaid Patent No. 2,281,977, they embody features of value in another type of shears. For instance Figs. 8 and 9 show a well known type of shears having laterally closable handles 60 and 61 pivotally connected at 62, with one blade 63 forming a direct continuation of its handle 60, and the other blade 64 having carrying ears 65, 65 pivotally connected transversely at 66 to a bearing boss 67 formed as an integral part of handle 61. The ears 65, 65 in this case are shown as extending angularly relative to a medial longitudinal center line of their blade 64. In this case, while closing pressure of the handles 60 and 61 cannot supplement the spring contact pressure of the blades 64 and 63, coil spring 68 may be given proper tension to maintain adequate cutting engagement of said blades, particularly if said blades are longitudinally curved or arched in usual and known manner. With such arched blades, spring 68 will absorb any tension of the closing blades, and will free their pivotal connection from any strain heretofore imposed thereon.

My improved construction, as embodied in Figs. 1 to 7 of the drawing, provides an improved shears in which the closing action of the handles insures proper and proportionate resilient engagement of the cutting edges of their blades without strain or wear on their pivotal connection; and in the shears shown in Figs. 8 and 9, a common feature will be found in that at least one blade has an independent pivotal movement transverse to their pivotal connection, and that spring means provides cutting tension of said blades without strain on their pivotal connection.

Other modifications than those shown and described may be developed within the spirit of my invention as defined in the following claims.

What I claim is:

1. In shears, a flat blade having a cutting edge and a vertical pivot post, a sleeve mounted to turn axially on said post, a blade-carrier transversely pivoted to said sleeve, a blade having a cutting edge secured to said carrier for vertical swing with the latter on said sleeve and axial turning movement with said sleeve on said pivot post, tension means normally maintaining shearing engagement of the cutting edge of said carrier-secured blade with the cutting edge of said first mentioned blade during axial movement of said blade-carrier with said post-mounted sleeve, and operating handles for turning said sleeve on said post.

2. In shears, a flat blade having a cutting edge and a vertical pivot post, a sleeve mounted to turn axially on said post, a blade-carrier transversely pivoted to said sleeve, a blade having a cutting edge secured to said carrier for vertical swing with the latter on said sleeve and axial turning movement with said sleeve on said pivot post, tension means normally maintaining shearing engagement of the cutting edge of said carrier-secured blade with the cutting edge of said first mentioned blade during axial movement of said blade-carrier with said post-mounted sleeve, and an operating handle for simultaneously turning said sleeve on its vertical pivot post and swinging said blade-carrier on its pivotal connection to said sleeve so as to supplement the spring tensioned shearing engagement of said blades.

3. In shears having a pair of pivotally connected blades relatively movable in parallel cutting relation, one of said blades having a separate cutting-end portion beyond its pivotally connected portion to the other blade, pivotally connected to the latter portion for independent pivotal movement of said cutting end portion transversely to its cooperative cutting movement with the other blade, and spring means for normally maintaining said blades in cooperating cutting engagement.

4. In shears, a pair of blades having cooperating cutting edges and a pivotal connection for parallel opening and closing movements of said blades to cross their cutting edges in a shearing operation, one of said blades having a jointed portion forward of and swingable at right angles to the axis of said pivotal connection, tension means for normally maintaining said jointed portion in shearing engagement with its pivotally connected cooperating blade, and handle means for moving said blades in shearing operation.

5. In shears, a pair of blades having cooperating cutting edges, and a connecting post for said blades forming a pivotal bearing for flat-wise opening and closing swing thereof to cross their cutting edges in shearing movements, one of said blades having a jointed portion forward of said pivotal bearing with a connecting pivot at right angles to the axis of said pivotal bearing forming a bearing for independent swing of said jointed portion at right angles to its shearing movement, tension means for normally maintaining the cutting edge of said jointed blade portion in engagement with the cutting edges of its cooperating blade throughout their shearing movements, and handle means for operating said cutting blades.

6. A pivotal connection for a pair of shear blades comprising a pivot forming a bearing for cooperative flat-wise opening and closing shearing movements of said blades, and a separate transverse pivot forming a bearing for one of said blades for independent swing thereof at right angles to its shearing movement.

7. In shears, a pair of blades having cooperating cutting edges and a pivotal connection for parallel opening and closing movements of said blades to cross their cutting edges in a shearing operation, one of said blades having a jointed portion forward of and swingable at right angles to the axis of said pivotal connection, and handle means for moving said blades on their pivotal connection and simultaneously swinging said jointed blade portion into handle-exerted pressed shearing engagement with its pivotally connected cooperating blade.

DAVID HOWARD KEISER, Jr.